United States Patent [19]
Asam

[11] 3,729,737
[45] Apr. 24, 1973

[54] RANGE TRACKING SYSTEM FOR USE IN AN INDEPENDENT AIRCRAFT LANDING MONITOR

[75] Inventor: Edward F. Asam, Dallas, Tex.

[73] Assignee: Texas Instruments Incorporated, Dallas, Tex.

[22] Filed: July 15, 1970

[21] Appl. No.: 55,165

[52] U.S. Cl. ............ 343/7.3, 343/5 LS, 343/100 CL
[51] Int. Cl. ............................................. G01s 9/18
[58] Field of Search ................ 343/5 R, 5 LS, 5 SL, 343/7 A, 7 TA, 7.3, 11 R, 13 R, 18 B, 18 C, 705, 756, 762, 786, 6.5 R, 6.5 LC, 100 CL

[56] References Cited

UNITED STATES PATENTS

| | | | |
|---|---|---|---|
| 3,177,484 | 4/1965 | Case et al. | 343/5 LS |
| 3,181,153 | 4/1965 | Cella | 343/5 LS |
| 3,439,333 | 4/1969 | Blitz | 343/5 R |
| 2,730,717 | 1/1956 | Katchky et al. | 343/756 |

Primary Examiner—Stephen C. Bentley
Attorney—James O. Dixon, Andrew M. Hassell, Harold Levine and Rene E. Grossman

[57] ABSTRACT

A range tracker for an aircraft landing monitor system which includes a plurality of passive reflectors arranged adjacent an airport runway in a predetermined pseudorandom coded configuration. A radar system carried by an aircraft transmits pulsed radar signals which are reflected from the reflectors according to the predetermined pseudorandom code. Correlation circuitry onboard the aircraft detects the presence of the coded radar returns from the reflectors. A range tracking circuit is operable in response to reception of the coded radar returns from the reflectors to determine and display the range of the aircraft to touchdown on the runway.

12 Claims, 4 Drawing Figures

Patented April 24, 1973  3,729,737

RANGE TRACKING SYSTEM FOR USE IN AN INDEPENDENT AIRCRAFT LANDING MONITOR

This invention relates to airborne radar systems, and more particularly to a range tracking system for use in an independent aircraft radar landing monitor system.

A number of aircraft guidance systems have previously been developed for assisting the landing of aircraft. However, the advent of large, high speed jet passenger aircraft, and the development of automatic landing systems such as flight director systems, have resulted in the need for an onboard aircraft landing monitor which is independent of ground based electronic guidance equipment to enable the pilot to progressively monitor the final aircraft approach, touchdown and rollout. Specifically, the need has arisen for an onboard independent landing monitor which provides the pilot with positive assurance that the aircraft localizer approach is valid, that the aircraft's true position relative to the runway center line and threshold is satisfactory and that the airport runway is clear of obstructions. Additionally, it is desirable to provide an independent indication of the range and range rate to touchdown on the airport runway. Such an independent landing monitor is particularly desirable during blind or low visibility aircraft takeoffs or landings, and during landings at airports which are unequipped or underequipped with navigational aids.

In accordance with the present invention, a short range, high resolution mapping radar system is located onboard an aircraft and is independent of ground based electronic equipment to monitor runway alignment, range to touchdown and the like during approach, touchdown and rollout phases of aircraft landing. The present system utilizes a high resolution antenna system in combination with a visual radar display which presents a "real-world" display of the approaching runway to the pilot on a one-to-one correspondence to real-world perspective. A range tracker system senses coded reflections from reflectors adjacent the airport runway to provide indications of range and range rate to touchdown. The pilot may then accurately identify the runway threshold, accurately determine the angle to center of the runway, measure lateral offset, determine range and range rate to touch-down and make a smooth transition to visual runway information.

In further accordance with the present invention, an aircraft range tracking system includes a radar system carried by an aircraft for detecting reflectors arranged in a predetermined coded configuration adjacent an object desired to be detected. A range tracker circuit is operable in response to detection of the coded configuration of reflectors for generating signals representative of the range to the object.

In accordance with another aspect of the invention, a range tracker is provided for use with an independent aircraft landing monitor. A radar antenna is carried by the aircraft for sweeping a radiation pattern sufficient for detection of coded reflectors located adjacent an airport runway during glideslope approach by the aircraft. Circuitry is responsive to the reflected energy from objects within the sweep of the antenna for generating a video signal. Circuitry is also provided to detect the presence of reflected signals within the video signal which emanate from the coded reflectors. Circuitry is operable in dependence upon the detector circuitry for generating indications of the range to the airport runway.

In accordance with yet another aspect of the present invention, a range tracker for an aircraft landing monitor includes a plurality of reflectors arranged adjacent an aircraft runway in a predetermined pseudorandom coded configuration. A radar system carried by an aircraft transmits and receives radar signals for detection of the runway area during glideslope approach by the aircraft. Circuitry is responsive to the radar system for detecting the presence of radar returns from the reflectors. A range tracker is operable in response to the radar returns for determining the range of the aircraft to touchdown on the runway.

In accordance with yet another aspect of the invention, a plurality of reflectors are located adjacent an airport runway for reflection of radar signals generated from an approaching aircraft. The reflectors are ranged in a predetermined coded configuration for enhancement of the detection thereof by the approaching aircraft. In the preferred embodiment, the reflectors are arranged in a pseudorandom coded configuration to reflect radar signals according to a Barker Code.

For a more complete understanding of the present invention and for further objects and advantages thereof, reference is now made to the following description taken in conjunction with the accompanying drawings, in which.

Figure 1:
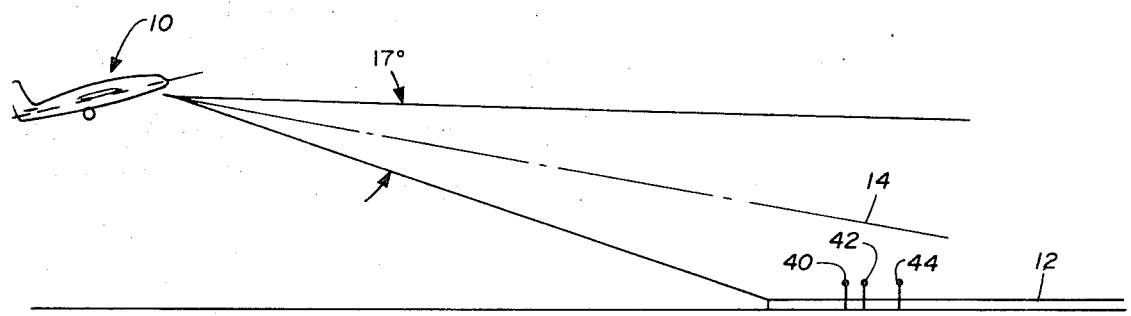
FIG. 1 is a somewhat diagrammatic illustration of the elevational antenna radiation pattern of the invention during glideslope approach.

Referring to the drawings, FIG. 1 illustrates an aircraft 10 in a conventional glideslope approach attitude to an airport runway 12. The glideslope 14 will typically have an angle in the range of 2.5° to 3.0°. According to the preferred embodiment of the invention, a radar beam is transmitted from the nose portion of the aircraft 10 with an elevational antenna beamwidth of about 17°. The antenna beamwidth is vertically centered about the glideslope 14 in order to enable high resolution radar mapping of the approaching runway 12 during landing approach of the aircraft 10. In the preferred embodiment of the invention, a maximum range of about 5 miles, with a range of about 2 miles for initial runway acquisition, is afforded to the landing monitor radar system carried by aircraft 10. Aircraft 10, landing with typical glideslope angles will thus be about 2,600 feet from the end of the runway 12 at an altitude of 200 feet and about 1,300 feet from the runway 12 at a decision altitude of 100 feet.

Figure 2:
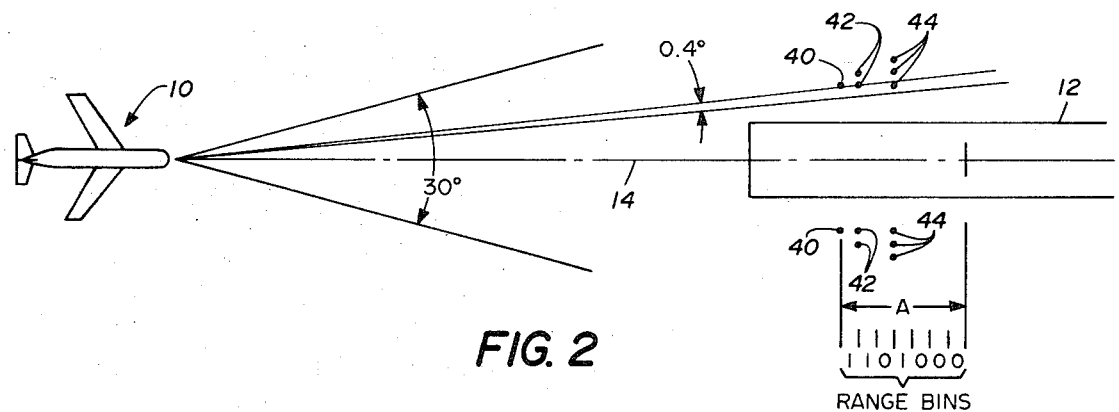
FIG. 2 is a diagrammatic illustration of the azimuth sweep of the antenna radiation pattern of the present invention and including the placement of reflectors according to a pseudorandom coded configuration adjacent the runway.

As shown in FIG. 2, the aircraft 10 transmits an antenna beam having an azimuth beamwidth of approximately 0.3° to 0.4°. The antenna beamwidth is continuously swept over an azimuth sweep angle of approximately 30°. In the preferred embodiment of the invention, the radar antenna aboard aircraft 10 is swept 15° on either side of the aircraft center line at a scan rate of about 2.5 Hz. The radar system thus looks at the runway area five times per second, since the beamwidth is about 0.4°, and since the pulse repetition rate in the preferred embodiment is 15,000 pulses per second, each point target results in about 21 radar returns per sweep. Hence, the present radar receiver receives bursts of radar returns at about 0.2 second intervals. The present airborne radar system is thus able to update the range data, in the manner to be later described, every 0.2 seconds, and the information utilized to update this data is based on at least 21 radar returns.

Figure 3:
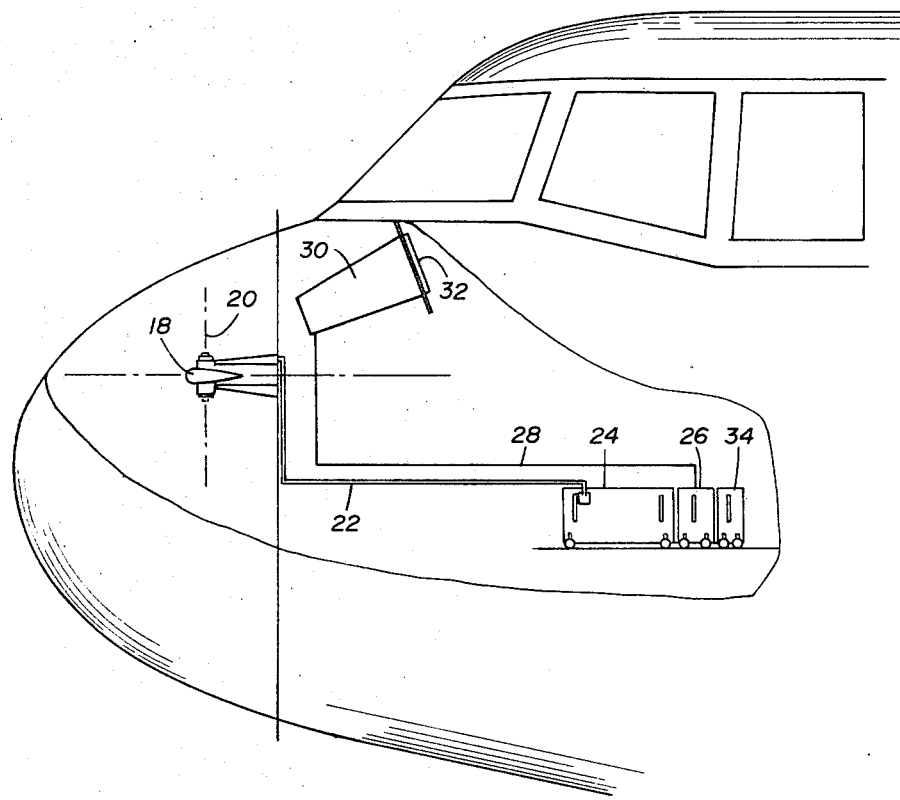
FIG. 3 is a diagrammatic illustration of the installation of the present landing monitor radar system in the nose of an aircraft.

FIG. 3 is a partially cut-away view of the nose portion of a conventional aircraft which illustrates the basic components of the present radar landing monitor system. A mechanically swept antenna 18 is mounted in the nose of the aircraft and comprises in the preferred embodiment an elongated resonant edge slotted waveguide array which is reciprocated about a vertical axis 20. Pulsed radar signals are transmitted via the antenna 18 through suitable waveguide connections 22 which extend from a transmitter-receiver housing 24. The present range tracking circuitry of the invention, to be later described in greater detail, is also located in housing 24. Sweep generator circuitry is located in housing 26 and provides electrical signals via leads 28 to a display monitor radarscope 30 mounted in the instrument panel of the aircraft. Display monitor radarscope 30 is preferably of the direct view storage tube type and provides a display surface 32 wherein the pilot may receive a real world perspective indication of the upcoming runway 12. Display monitor radarscope 30 includes various adjustments and select knobs to provide alternate conventional B-sweep or PPI display sweep modes, if desired. Power supply circuitry for the system is contained within a housing 34.

The present system provides a practical independent landing monitor system for use with such large passenger capability superjet aircraft as the Lockheed L1011 transport aircraft or the DC-10 aircraft. The present high resolution rate radar system permits visual assessment to the pilot of the aircraft's alignment with the runway center line during the final phase of approach, and provides accurate range information to touchdown, even in the event of inclement weather such as rain, snow or fog which provides zero-zero visibility.

For a more detailed description of the antenna 18, reference is made to the copending patent application, Ser. No. 054,990, filed July 15, 1970, and entitled "Mechanically Swept Radar Antenna For Use With An Aircraft Landing Monitor System". For more detailed information of the overall independent landing monitor radar system of the invention, reference is made to the copending patent application, Ser. No. 054,990, filed July 15, 1970, and entitled "Independent Aircraft Landing Monitor System". A detailed description of the real-world display system of the invention, wherein a display of the approaching runway is provided with real-world linear perspective is found in copending patent application, Ser. No. 055,166, filed July 15, 1970, and entitled "Real-World Perspective Display For Use With An Independent Aircraft Landing Monitor System". While the above noted independent landing monitor radar system is desirable for use with the present range tracking system, it will be understood that other airborne radar systems could be utilized in conjunction with the present radar range tracking system if desired.

Referring again to FIGS. 1 and 2, an important aspect of the present range tracking system is the provision of a plurality of radar reflectors 40, 42 and 44 along each side of the airport runway 12. Reflectors 40-44, which preferably are corner reflectors which act as ideal point targets, are arranged in a coded configuration in order to enhance the detection thereof by the airborne radar system. In the preferred embodiment, the reflectors 40, 42 and 44 are arranged in a spaced apart coded configuration in order to "modulate" the return radar video signal with a pseudorandom digital code. When the radar receiver located onboard aircraft 10 detects the presence of the predetermined pseudorandom code in the radar return, the present radar tracker is able to lock on and track the range of the coded corner reflectors 40-44 with great accuracy.

In the preferred embodiment of the invention, the coded reflectors 40-44 are disposed along each side of the runway 12 along an interval A which may comprise for instance, a length of about 350 feet. The interval A is divided into seven range bins, and the presence or absence of a corner reflector in each of the range bins corresponds to either a logic one or a logic zero in the predetermined pseudorandom code. In the preferred embodiment of the invention, a seven bit Barker pseudorandom code is utilized which has the form of "1101000." The resolution of the present radar system dictates a range bin dimension of about 50 feet in length, so the entire reflector array, including vacant range bins for logic "zeros," occupies about 350 feet along each side of the runway 12. The range bins along dimension A terminate at the desired point of touchdown on runway 12, which may be for instance about 1,000 feet from the end of the runway.

The multiple radar reflectors 42 and 44 are utilized in the second and fourth range bins in order to insure that all three of the logic "ones" of the predetermined code simultaneously appear within the narrow transmitted radar beam as the look angle of the radar system changes with respect to the corner reflectors. Thus, as the aircraft 10 approaches the runway 12, the swept radar beam will always simultaneously sense the logic ones in the predetermined code even as the look angle continuously varies.

Pseudorandom codes are preferably utilized with the present reflector configurations, due to the fact that such codes provide high autocorrelation functions at code coincidence, thus enabling extremely high certainty of detection of the coded reflectors along the runway. As is known, such pseudorandom codes are distinguished by the fact that the probability of each portion of the code being a one or a zero is equal, and due to the fact that the autocorrelation function is generally equal to zero except when identity or coincidence is obtained. For a more detailed description of pseudorandom codes, reference is made to Modern Radar, by Berkowitz, Chapter 4, published 1965 by Wiley & Sons, Inc. For further information on Barker codes, reference is made to "Group Synchronizing of Binary Digital Systems," Communication Theory, by R. H. Barker et al., New York, Academy Press, Chapter 19, 1953.

Although a 7 bit Barker pseudorandom code has been illustrated in the preferred embodiment, it will be understood that other binary codes could be utilized to provide varying degrees of resolution according to different desired operating characteristics of the system.

Figure 4:
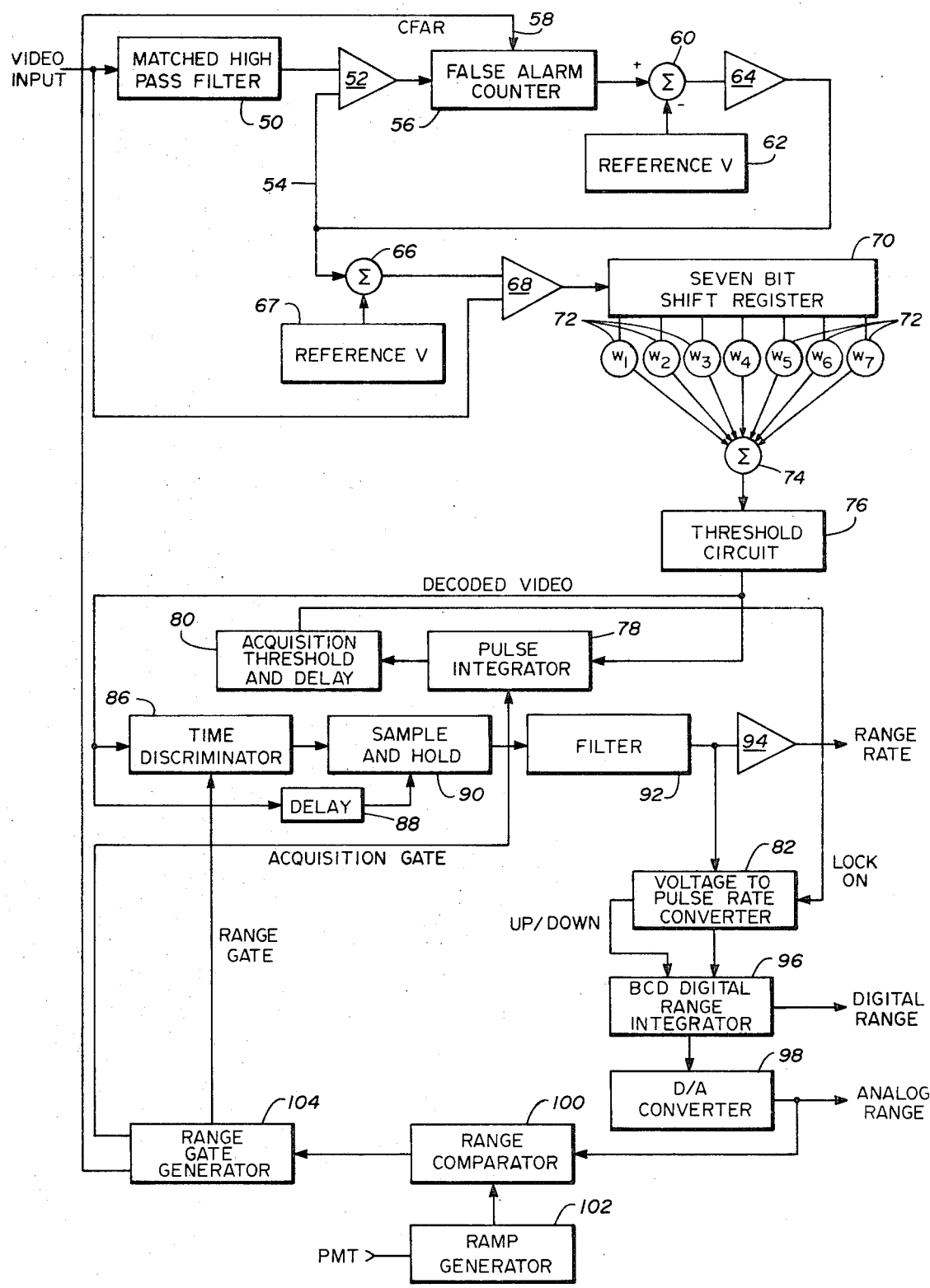
FIG. 4 is a block diagram of the preferred embodiment of the present range tracking system.

FIG. 4 illustrates a block diagram of the preferred embodiment of the range tracker circuitry of the invention. A radar video input signal generated by the radar receiver circuitry in housing 24 is fed to a matched high pass filter 50. This video input is preferably generated by the receiver circuitry described in the previously identified copending patent application, Ser. No. 054,979, filed July 15, 1970, "Independent Aircraft Landing Monitor System", but may alternatively be generated other other known types of pulse radar systems wherein video pulses representative of return radar echoes are developed from the return radar signals.

The matched high pass filter 50 is matched to the expected received square pulse from the corner reflectors 40–44 and thus the filter 50 tends to pass radar returns from the point targets and to attenuate returns from distributed targets. Filter 50 is thus matched to maximize the signal-to-noise ratio between the expected radar returns from the coded reflectors and between ground noise and clutter. The filtered signal is fed to a comparator circuit 52, wherein a comparison is made of the magnitude of the filtered signal and a threshold level signal supplied on lead 54. Comparator 52 generates a logic "1" output whenever the filtered video signal exceeds the reference threshold appearing on lead 54. The threshold level signal is varied, in a manner to be subsequently described, to provide a constant false alarm rate (CFAR).

The output from the comparator 52 is fed to a false alarm counter circuit 56, which is a range gated integrator operated in response to a CFAR gate signal supplied via a lead 58. The output of this integrator is a voltage proportional to the number of threshold crossings which occurred during the length of the CFAR gate pulse. The resulting signal fed from a counter 56 is fed to a summing network 60, wherein the signal is algebraically summed with a voltage from a reference voltage source 62. The voltage level of reference source 62 is proportional to the desired number of false alarms. The resulting output signal from the summing circuit 60 is an error signal which is applied to an amplifier 64. The amplified error signal is fed back through lead 54 to the comparator 52 as the CFAR threshold level signal. This threshold level signal is raised or lowered depending on the polarity of the reference signal, to provide the same number of false alarms, which are caused by noise or clutter, for the system, independent of the various reflection characteristics of a particular airport.

The CFAR threshold signal is also applied to a summing point 66. A voltage from a reference voltage generator 67 is also applied to the summing point 66 and the resulting signal is applied to an input of a voltage comparator circuit 68. The voltage level at the output of summing point 66 is such that the probability of false alarm is maintained below a specified maximum. The video input is applied to the second input of the comparator 68, and the resulting output is applied to a seven bit shift register 70. The output of comparator 68 is a logic one when the input video is above the voltage threshold, and the information is shifted into shift register 70.

Each output of the shift register 70 is connected through a weighting function circuit 72 and then applied to a summing network 74. It will be understood that the shift register 70 and the summing network 74 comprise a seven bit correlation circuit. The shift register 70 may, for instance, comprise seven flipflop circuits each generating a +flipflop 1 or −1 voltage signal, dependent upon whether or not the digital information stored in a particular flipflop is in agreement with the corresponding bit in the desired Barker code. Thus, the register 70 compares the received radar returns with a stored representation of the predetermined pseudorandom code. Upon summation of the outputs of the shift register 70 at the summing circuit 74, the resulting voltage indicates the correlation of the stored signal within the shift register 70 with the predetermined Barker code being utilized.

As an example, with the use of the configuration shown in FIG. 2 of the reflectors 40, 42 and 44, when a digital signal 1101000 is stored in the shift register 70, a high voltage indication is generated by the summing circuit 74 and applied to a threshold circuit 76. If a different code is stored in the shift register 70, the output from the summing circuit 74 would be substantially lower due to the definition of a pseudorandom code. The correlation circuitry utilized with the present invention thus provides a very high probability of detection of the coded configuration of reflectors when a high signal is applied from the summing network 74 to the threshold circuit 76. Threshold circuit 76 passes only signals above a predetermined threshold to prevent operation of the circuit until a particular coded configuration of reflectors adjacent a runway airport are sensed. The magnitude of the threshold circuit 76 is set to obtain a desired probability of detection for the circuit. It will be understood that other types of correlation circuits could be utilized for detection of the predetermined code of the invention, and for further reference to such correlation circuits, reference is made to Radar Detection, by DiFranco and Rubin, 1968, Section V, Prentice-Hall.

The output of the threshold circuit 76 is termed the decoded video signal and is applied to a gated pulse integrator 78. The integrator 78 is gated by an acquisition gate generated by the range tracker circuitry to be subsequently described. Whenever the acquisition gate and the output from the correlation circuit are coincident, a given voltage is added to the pulse integrator circuit. Thus, if a sufficient number of pulses arrive at the pulse integrator 78 within a predetermined period of time, the output generated by the integrator 78 will exceed an acquisition threshold voltage set within the acquisition threshold and delay circuit 80. This high output from the integrator 78 indicates that a valid target has been decoded by the system, and a lock-on signal is generated after a predetermined delay from the acquisition threshold and delay circuit 82 and applied to the voltage to pulse rate convertor 82. The lock-on signal indicates that the range computer of the system is tracking the point of touchdown on the airport runway 12. If two scan periods of the system pass without detection of a threshold crossing by the circuit 80, the system drops out of the track mode and the target search mode of the system resumes.

The range tracker portion of the present system is an approximate type II servo mechanism tracking loop in the track mode of operation, and a type I servo mechanism during acquisition mode. The decoded video signal is applied to a time discriminator circuit 86, and also to a delay 88. The output of the time discriminator circuit 86 is proportional to the time differential between the decoded video and the range gate. The outputs of the time discriminator 86 and of the delay 88 are applied to a sample and hold circuit 90. The sample and hold circuit 90 comprises a gated amplifier which utilizes a storage capacitor for the sampling function. FET devices are utilized within the gated amplifier to give high impedance isolation. The output of the sample and hold circuit 90 is applied through a low pass filter 92 wherein the cutoff frequency of the system is optimized. The output of the filter 92 is applied through an amplifier 94 which generates an output signal indicative of the range rate of the system during lock-on tracking mode operation.

The output of the filter 92 is also applied to a voltage to pulse rate convertor 82 which is operated in dependence upon the lock-on signal generated by the acquisition threshold and delay circuit 80. The output of the pulse rate convertor 82 is a pulse train with a pulse rate proportional to the magnitude of the filtered and amplified error voltage of the system. The output of the convertor 82 is applied to a binary coded decimal digital range integrator circuit 96 which in turn generates a digital output indicative of the range being tracked by the system. An up-down count signal is also applied from the converter 82 for operation of the range integrator 96. The range integrator 96 may comprise any one of a number of suitable conventional circuits, such as the Ser. No. 54192 or Ser. No. 74192 circuits manufactured and sold by Texas Instruments Incorporated.

The output of the range integrator 96 is fed to a digital to analog convertor which generates an analog indication of the range being tracked by the circuit. The output of the convertor 98 is also fed to a range comparator circuit 100. A ramp voltage is also applied to an input of the range comparator 100 by a ramp generator 102 which is controlled by the premaster trigger (PMT) of the radar system. The comparator 100 generates a pulse at time coincidence when the ramp voltage equals the internal range voltage generated by the convertor 98. The output from the range comparator 100 is fed to the range gate generator 104, which generates the acquisition gate applied to the pulse integrator 78 and also which generates the CFAR gate applied via lead 58 to the false alarm counter 56 and the range gate applied to the time discriminator 86.

In operation of the range tracking circuitry during the search mode of operation, the lock-on signal applied to the voltage to pulse rate convertor 82 is at logic zero. This places a bias at the input to the voltage to pulse rate convertor 82 which causes the range integrator 96 to count from minimum to maximum range in a predetermined sweep interval. The digital signal from the range integrator 96 is converted to a proportional analog voltage by the convertor 98. The resulting internal range voltage then sweeps repeatedly from a minimum value to a maximum value until lock-on occurs.

The premaster trigger (PMT) initiates the generation of a ramp voltage each time a pulse is transmitted by the radar system. At the time when the ramp voltage and internal range voltage are equal, the output of the range comparator 100 changes from a logic "0" to a logic "1." This transition triggers the CFAR gate from the range gate generator 104, as well as triggers the generation of the acquisition gate and the range gate therefrom. These gates sweep from minimum range to maximum range until the target decoder portion of the circuitry detects the presence of the Barker code in the reflected radar video. This causes the lock-on signal to go from logic "0" to logic "1," and places the tracker system in the track mode of operation.

When the present range tracker is in the track mode of operation, each time the predetermined reflector target is detected, the time discriminator circuit 86 generates an error signal whose magnitude and polarity are proportional to the time error between the range gate and the decoded video signal. The delayed video signal from the delay 88 triggers the sample and hold circuit 90, which then holds the generated time error until the next reflected video pulse is received. The bandwidth of the sample and hold circuit is such that it averages the error over the entire burst of twenty or more radar returns per scan of the radar system. Consequently, the tracking loop treats each burst of decoded pulses as a single sample. The amplified and filtered error signal from the filter 92 is thus proportional to the range rate between the aircraft and the point of touchdown. This voltage is also utilized to update the range integrator 96 and subsequently to position the various range gates of the circuitry.

The outputs of the present range tracker thus generate range and range rate information in either analog or digital form. This information may be displayed upon the display 32 to provide the pilot with an accurate indication of the range to touchdown during landing approach.

Additionally, since the antenna scan voltage of the present system is proportional to the angular position of the radar antenna 18 to the glideslope, the magnitude of the sampled scan voltage represents the angle at which the coded array of reflectors are located with respect to the aircraft. Since the reflectors are located on both sides of the runway, the sample scan voltages may be filtered to provide a voltage proportional to the angle corresponding to the center line of the runway. This angle information may also be displayed to the pilot to indicate the position of the runway during landing approach.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. An aircraft range tracking system comprising:
   radar means carried by an aircraft for detecting reflector means adjacent an object desired to be detected and arranged in a predetermined coded configuration to reflect radar signals according to a pseudorandom code, means for comparing said reflected radar signals against stored representations of said pseudorandom code, and range tracking means operable in response to detection of the coded configuration of the reflector means for generating signals representative of the range to said object.

2. The range tracking system of claim 1 wherein said reflector means are passive reflectors arranged in a spaced apart configuration, the spaces between said reflectors being determined in accordance with a predetermined pseudorandom code.

3. A range tracker for an independent aircraft landing monitor comprising:

radar antenna means carried by an aircraft for sweeping a radiation pattern sufficient for detection of coded reflection means located adjacent an airport runway during approach by the aircraft, said reflection means arranged to reflect energy according to a preset pseudorandom digital code, means responsive to reflected energy from objects within the sweep of said antenna means for generating a video signal, means for detecting the presence of reflected signals within said video signal which emanates from said coded reflection means and correlating the received reflected signals with said preset pseudorandom code, and means operable in dependency upon said detecting means for generating indications of the range to said airport runway.

4. The range tracker of claim 3 wherein said antenna means directs a radiation pattern narrower in the azimuth than in the elevation plane.

5. The range tracker of claim 3 and further comprising:

means operable in dependence upon said detecting means for generating indications of the range rate.

6. A range tracker for an aircraft landing monitor comprising:

a plurality of reflector means arranged adjacent an airport runway in a predetermined pseudorandom coded configuration, radar means carried by an aircraft for transmitting and receiving radar signals for detection of the runway area during approach by the aircraft, means responsive to said radar means for detecting the presence of radar returns from said reflector means and including correlation means for correlating said radar returns with a predetermined pseudorandom code reference, and tracking means operable in response to said radar returns for determining the range of the aircraft to touchdown on said runway.

7. The range tracker of claim 6 wherein said pseudorandom coded configuration reflects radar signals according to a Barker Code.

8. The range tracker of claim 6 wherein said reflector means are spaced apart according to said pseudorandom coded configuration, the presence of said reflector means being indicative of a logic one and the absence of said reflector means being indicative of a logic zero.

9. The range tracker of claim 6 and further comprising:

plural reflector means being located along lines perpendicular to the runway sides to facilitate detection thereof as the aircraft lands.

10. A range tracker for an aircraft landing monitor comprising:

a plurality of reflector means arranged adjacent an airport runway in a predetermined pseudorandom coded configuration, radar means carried by an aircraft for transmitting and receiving radar signals for detection of the runway area during approach by the aircraft, means responsive to said radar means for detecting the presence of radar returns from said reflector means, means, tracking means operable in response to said radar returns for determining the range of the aircraft to touchdown on said runway, said tracking means comprising time discrimination means for comparing the relative time arrivals of said radar returns with a range gate signal, the output of said discrimination means being proportional to said range, and means for comparing said output with a ramp signal initiated in response to a radar timing signal and for generating said range gate signal in response to said comparison.

11. The range tracker of claim 6 wherein said correlation means comprises:

a plurality of series connected bit registers for receiving said radar returns and for generating output signals in response thereto, means for summing said output signals, and means for generating an output signal when the sum of said output signals is greater than a predetermined threshold value.

12. The range tracker of claim 6 and further comprising:

radarscope means for visually displaying the detected range.

* * * * *